United States Patent [19]
Russell et al.

[11] Patent Number: 6,088,390
[45] Date of Patent: Jul. 11, 2000

[54] INTEGRATING DECISION FEEDBACK EQUALIZATION AND FORWARD ERROR CORRECTION TO IMPROVE PERFORMANCE IN POINT-TO-MULTIPOINT DIGITAL TRANSMISSION

[75] Inventors: Mark Russell, Austin, Tex.; Vladimir Friedman, Scotch Plains, N.J.; Stuart D. Sandberg, Arlington, Mass.

[73] Assignees: Analog Devices, Inc., Norwood; Aware Inc., Bedford, both of Mass.

[21] Appl. No.: 08/898,166

[22] Filed: Jul. 22, 1997

[51] Int. Cl.[7] ............................... H03H 7/30; H03H 7/40
[52] U.S. Cl. ............................... 375/233; 371/35
[58] Field of Search .................... 375/250, 243, 375/233, 254; 371/39.1, 38.1, 37.7, 35, 41

[56] References Cited

U.S. PATENT DOCUMENTS

| | | | |
|---|---|---|---|
| 4,238,852 | 12/1980 | Iga et al. | 371/37.7 |
| 4,445,216 | 4/1984 | Kobari et al. | 371/39 |
| 4,539,684 | 9/1985 | Kloker | 371/46 |
| 4,833,693 | 5/1989 | Eyubogle | 375/254 |
| 4,875,222 | 10/1989 | Kashida et al. | 375/243 |
| 4,916,702 | 4/1990 | Berlekamp | 371/39.1 |
| 5,506,956 | 4/1996 | Cohen | 395/182.04 |
| 5,519,830 | 5/1996 | Opoczynski | 395/182.02 |
| 5,586,121 | 12/1996 | Moura et al. | 370/404 |
| 5,621,753 | 4/1997 | Weber | 375/202 |

*Primary Examiner*—Stephen Chin
*Assistant Examiner*—Thomas E McKiernan
*Attorney, Agent, or Firm*—Samuels, Gauthier & Stevens, LLP

[57] ABSTRACT

A method and system which combines a properly designed FEC and the periodic transmission of known symbols to obtain a desired error performance in a point-to-multipoint digital transmission system employing a DFE which induces error propagation. A transmitter unit includes a forward error correction encoder (FEC) which implements a code to information provided to an input of a data interleaver having block length N and interleaving depth D, and a data modulator which is coupled to an output of the data interleaver to receive a stream of data symbols. At least one receiver unit includes a decision feedback equalizer (DFE) which includes a feedback filter and provides an input to a data deinterleaver having block length N and interleaving depth D, and a FEC decoder which receives data from an output of the data deinterleaver. Sequences of known symbols of length at least equal to the length of the feedback filter are periodically added to the output of the data interleaver. The receiver unit uses knowledge of the sequence to pass correct data to the feedback filter. The number of data symbols between the periodic sequences is made equal to an integer multiple k of the interleaving Depth D, thus limiting error propagation to cause no more than k errors per codeward of block length N. The FEC code serves to correct the k errors per error propagation event.

4 Claims, 2 Drawing Sheets

INTEGRATING DECISION FEEDBACK EQUALIZATION AND FORWARD ERROR CORRECTION TO IMPROVE PERFORMANCE IN POINT-TO-MULTIPOINT DIGITAL TRANSMISSION

BACKGROUND OF THE INVENTION

The invention relates to a method and system which combines decision feedback equalization and forward error correction to improve performance in point-to-multipoint digital transmission systems.

Many channels used for digital data transmission subject the received signal to a variety of sources of degradation, including Guassian noise, time dispersion, and impulse noise. A twisted pair used for digital subscriber loops is a particularly severe example of such a channel, where non-stationary noise sources such as narrowband interference (induced by AM radio, amateur radio) and periodic impulse noise (e.g., due to light dimmers) can also be a problem. To achieve the desired performance, powerful signal processing techniques are required to recover the data. Two particular techniques that have found widespread use is decision feedback equalization and forward error correction (FEC).

A decision feedback equalizer (DFE) is a non-linear equalizer that uses decisions on previously transmitted data symbols to suppress the intersymbol interference (ISI) due to past data symbols. The structure of a DFE 10 is shown in FIG. 1, where a discrete-time, baseband equivalent model of the channel is assumed. The DFE includes a forward filter 12, a signal adder/subtractor 14, a decision element 16, and a feedback filter 18. A sample at the input to the forward filter contains contributions due to both past and future symbols. The forward filter 12 serves to at least suppress the contribution of future symbols as well as those of past symbols outside the span of the feedback filter. The feedback filter 18 then uses decisions on previous symbols to generate an estimate of the remaining ISI, which is subtracted from the decision variable. If the filters are sufficiently long and the previous decisions are correct, the DFE can remove ISI without the significant noise enhancement that can result if the feedback filter is not included. While not included in the foregoing description, it will be appreciated that DFEs can be either realvalued or complex-valued and the forward filter can perform other functions, such as frequency translation.

A drawback to decision feedback equalization is that decision errors within the span of the feedback filter will degrade the estimate of the ISI due to past symbols. The resulting decision variable will thus include residual ISI as well as noise, increasing the probability that the current decision will be incorrect. If this effect leads to further errors, the phenomenon is known as error propagation. The extent of error propagation is a function of the magnitude of the residual ISI, which in turn is a function of the size of the data alphabet and the magnitude of the coefficients of the feedback filter. When the channel is severely distorting, and especially when strong narrowband interference is present, the feedback filter taps can become quite large. Large signal alphabets are also quite common for high rate transmission, such as over twisted pair for digital subscriber loops. A DFE used in these environments can thus be subjected to a situation where error propagation can continue for an unacceptably long time. This is known as catastrophic error propagation.

In point-to-point transmission, error propagation can be avoided through the use of preceding. This technique entails performing the feedback portion of the DFE operation at the transmitter, where the data is known. To do this, the transmitter must implicitly have knowledge of the channel response. In a point-to-multipoint environment, however, the transmitted signal traverses multiple channels, and it is not possible to use the preceding method. Conventionally, in this situation, the assumption has been that the effects of error propagation can be accepted. However, for high-speed transmission such as the digital subscriber line, it must be assumed that error propagation will be significant and will continue until a successive number of correct decisions are made at least equal to the length of the feedback filter.

SUMMARY OF THE INVENTION

A method and system which combines a properly designed FEC scheme and the periodic transmission of known symbols to obtain a desired error performance in a point-to-multipoint digital transmission system employing a DFE which induces error propagation. A transmitter unit includes a forward error correction encoder (FEC) which generates encoded information provided to an input of a data interleaver having block length N and interleaving depth D, and a data modulator which is coupled to an output of the data interleaver to receive a stream of data symbols. At least one receiver unit includes a decision feedback equalizer which includes a feedback filter and provides an input to a data de-interleaver having block length N and interleaving depth D, and a FEC decoder which receives data from an output of the data de-interleaver. Sequences of known symbols of length at least equal to the length of the feedback filter are periodically added to the output of the data interleaver. The receiver uses knowledge of this sequence to pass correct data to the feedback filter, which will with high probability halt any error propagation that may be occurring. The number of data symbols between the periodic sequences is made equal to an integer multiple k of the interleaving Depth D, thus limiting error propagation to cause no more than k errors per codeward of block length N. The FEC code serves to correct up to Ne(k) errors per N code symbols, where Ne is the number of channel errors plus error propagation events per N code symbols and N is the de-interleaver block length.

DETAILED DESCRIPTION OF THE ILLUSTRATED EMBODIMENTS

Forward error correction is a technique whereby controlled redundancy is added to the transmitted data sequence such that the possible transmitted symbol sequences are a well-designed subset of the possible received symbol sequences. When the errors are random, the decoder's function of mapping the received sequence to the most likely allowable transmitted sequence then serves to provide an improvement in performance.

Figure 1:
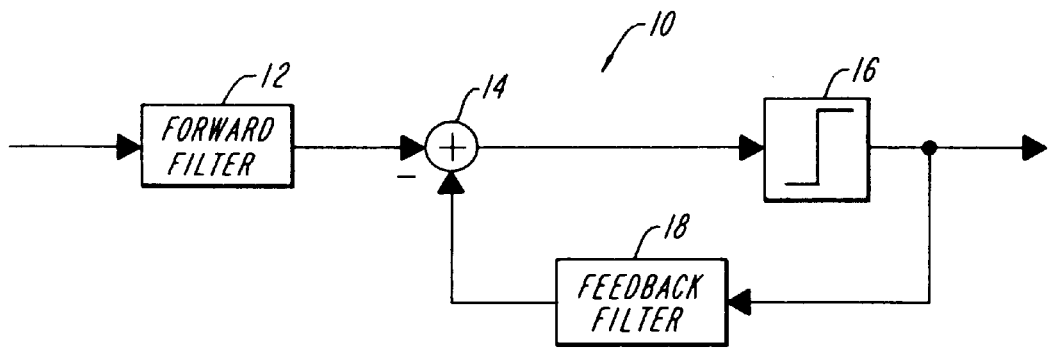
FIG. 1 is a schematic block diagram of a conventional decision feedback equalizer.
Figure 2:
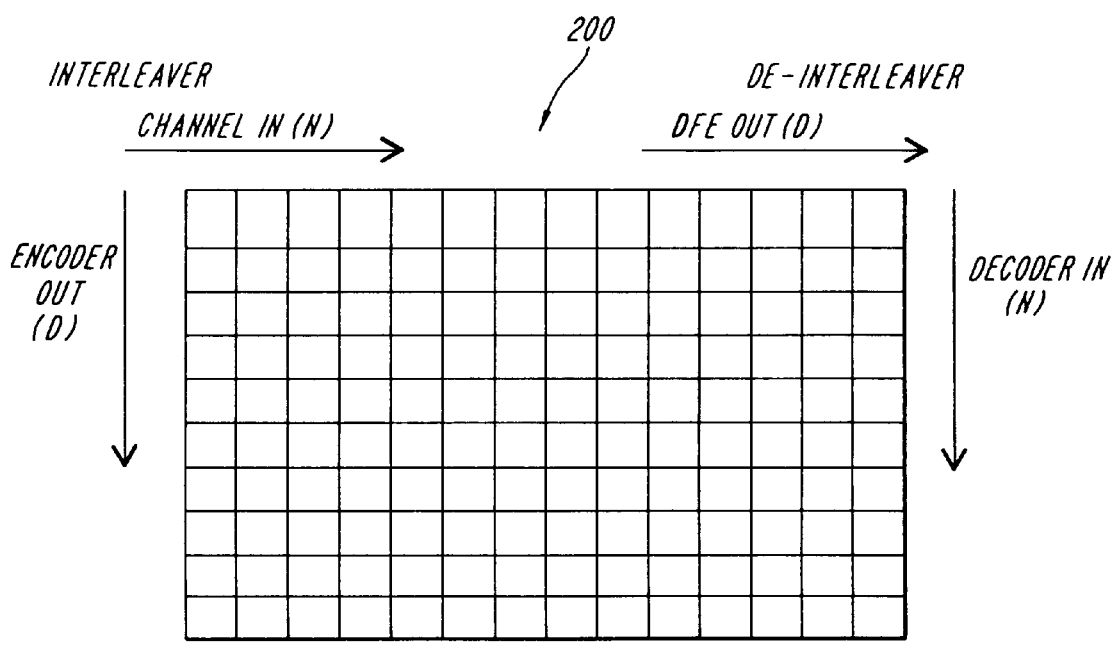
FIG. 2 is a schematic diagram of a DXN block interleaver.

When the errors are bursty, such as results from impulse noise, the performance advantages of the FEC can be maintained through the use of interleaving. FIG. 2 shows an exemplary D×N block interleaver, for example a D×N RAM, where N is the length of the row and D is the length of the column. At the transmitter, the data is read in row-wise and read out column-wise. At the receiver, the inverse operation is performed, making use of a N×D de-interleaver. If the span of the interleaver is much larger than the length of an error burst, then the error pattern at the FEC decoder input will be randomized. Note that a variety of interleaver types are known, and the block interleaver of FIG. 2 is only used as an example. A generalized interleaver is defined by the block length N and interleaving depth D. A commonly-used FEC scheme for channels with bursty errors is Reed-Solomon (RS) codes, although other techniques can be used as well.

Figure 3:
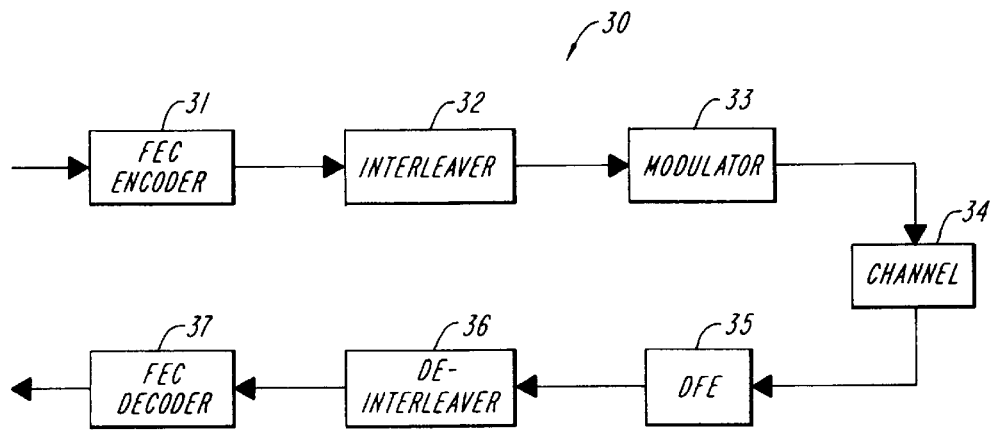
FIG. 3 is a schematic block diagram of an exemplary digital transmission system, where the receive path is assumed to be only one in a point-to-multipoint scenario.

The invention involves combining a DFE with selected forms of FEC. A block diagram of an exemplary digital transmission system 30 is shown in FIG. 3, where the receive path is assumed to be only one in a point-to-multipoint configuration. The system includes in series an FEC encoder 31, an interleaver 32, a modulator 33, a transmission channel 34, a DFE 35, a de-interleaver 36, and a FEC decoder 37. It is typical in the art for the DFE and the FEC to be viewed as independent subblocks. In the point-to-multipoint cases with severely distorting channels of concern, however, the DFE must also be viewed as a source of burst errors, for which the FEC must be designed to correct, thus forming the basis of the invention.

For purposes of illustrating the invention, it is assumed that the characteristics of the modulation technique of modulator 33 and channel 34 are such that catastrophic error propagation is possible. One exemplary scenario is wideband transmission over digital subscriber loops which is subjected to strong narrowband interference. The forward filter (not shown) of the DFE 35 will generate a narrowband notch to attenuate the interference, which can in turn cause the feedback filter taps (not shown) of the DFE to become large. Use of higher-level signal constellations is also typical for these applications.

It is also assumed for purposes of illustrating the invention that events that initiate error propagation are sufficiently frequent as to lead to an unacceptable error rate. For example, periodic impulse noise, such as can be found on twisted pair and coaxial cable channels within the home, could cause decision errors with high probability, leading to periodic error propagation events.

Figure 4:
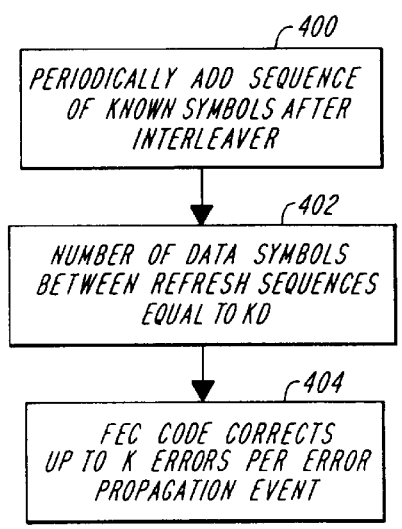
FIG. 4 is a flowchart showing a method of integrating DFE and FEC to improve performance in point-to-multipoint digital transmission in accordance with the invention.

A method of integrating DFE and FEC to improve performance in point-to-multipoint digital transmissions in accordance with the invention is now described with reference to the flowchart of FIG. 4.

Initially, a periodic sequence of known symbols, referred to as a "refresh sequence", of length at least equal to the length of the feedback filter is periodically added to the interleaver output and transmitted (step 400). The receiver of this transmission will use knowledge of this sequence to pass correct symbols to the feedback filter, and thus terminate any error propagation. If it is also desired to transmit known data for other purposes such as training equalizer coefficients, this functionality may also be integrated into the refresh sequence.

Next, the number of data symbols between refresh sequences is made equal to an integer multiple of the interleaving depth kD (step 402). This will ensure that a bursty error event due to the channel (i.e. impulse noise) and/or error propagation will cause no more than k errors per N code symbols. The known refresh symbols are removed from the data stream before the data stream is applied to the de-interleaver. Ideally, one would like to design the refresh sequence such that its time span is longer than the channel effects that initiate error propagation, i.e., periodic impulse noise. This will prevent the channel effect from degrading the data both before and after the refresh sequence. If this is not possible, then the probability of the channel effect spanning the refresh sequence can be made small by making the time span of kD much larger than that of the channel effect.

The FEC code is configured such that it can correct the k errors per error propagation event in addition to any other requirements placed on it (step 404). Neglecting the effects of non-stationary channel noise and error propagation, a particular DFE design will generate a particular code symbol error rate $P_{e,dfe}$ when subjected to a given channel. When error propagation is included, the error probability increases to a value of less than $k \times D \times P_{e,dfe}$. The characteristics of the non-stationary noise, i.e., periodic impulse noise, will either be deterministic or will have a probability distribution that can be used to determine the number of occurrences per de-interleaver span, each of which can combine with error propagation to contribute up to k errors per N code symbols. The FEC correction capability, de-interleaver block length N, and interleaving depth D are determined as part of a joint optimization procedure which uses knowledge of the channel characteristics, maximum allowable interleaving RAM size, maximum allowable system delay, and the allowable overhead of FEC and the periodic known refresh sequence.

As an illustrative example, consider the case where the channel characteristics include time dispersion, Guassian noise, strong narrowband interference, and periodic impulse noise from a single source. The time dispersion and narrowband interference give rise to the situation where error propagation is likely, and the periodic impulse noise will generate burst errors and initiate error propagation on an excessively frequent basis. Conventionally, the dimensions of the interleaver would be determined based on the characteristics of the channel impulse noise. According to the invention, the FEC and interleaver design is dependent on both the impulse noise characteristics and the period of the refresh sequence.

The requirements on RAM size and system delay are such that the time span of the de-interleaver is less than a dimmer period. By requiring the time span of k×D to be much greater than that of a dimmer impulse, the combination of dimmer impulse noise and the ensuing error propagation will with high probability yield at most k errors per N code symbols.

The FEC is then designed to correct k+1 code symbol errors out of N, where the additional error correction serves to further improve the error performance. The percentage overhead due to the periodic refresh sequence is M/(M+k×D), where M is the number of code symbols in the periodic refresh sequence. The overhead due to FEC, where Reed-Solomon coding is assumed, is 2(k+1)/N.

For purposes of illustration, consider transmission at a rate of 51.84 Mbps at 4 bits/symbol over a dispersive channel with periodic impulse noise, Gaussian noise, and strong narrowband interference. The narrowband interference and channel dispersion lead to a scenario in which catastrophic error propagation must be assumed possible. The desired system bit error rate (BER) of $10^{-10}$ is obtained using a DFE with 24 feedback taps and an (N,N−2t) RS block FEC. The RS FEC code symbols are over GF(256) and use bytes as their units, and requires 2t checkbytes to correct t errors per codeword (one column of the de-interleaver corresponds to a codeword of length N). Sources of periodic impulse noise combine to cause four short impulse events every 8ms (the time relationship between the impulses is unknown). The DFE is designed to give a BER of 10-7 when discounting impulse noise and error propagation.

As discussed previously, conventionally the dimensions of the interleaver would be determined based on the characteristics of the channel impulse noise. According to the invention, the FEC and interleaver design is dependent on both the impulse noise characteristics and the period of the refresh sequence. The design will also typically be limited by system constraints such as size of interleave RAM, latency, and allowable overhead. The overhead due to refresh is a function of D, while the overhead due to FEC is a function of N.

For this example, RAM and latency constraints lead to choosing an interleaver span of approximately 5ms, which is less than the period of the impulse noise. Joint optimization over the refresh and checkbyte overhead leads to k=1 and a (76,66) code with 10 checkbytes to correct 5 byte errors per N bytes. By choosing N=76, correction of one random byte error (due to Guassian noise) at a rate of 10-7 will yield an error rate at the output of the decoder of 10-10. Thus, t=5 is sufficient to correct errors due to the four impulse noise events as well as reduce the overall error rate to 10-10, while keeping kD much greater than the span of a periodic impulse event. The value of D is 428 bytes, and the transmitter sends 24 DFE refresh symbols (12 bytes) after every 428 data bytes. As the line rate is 51.84 Mbps, the overhead due to refresh is 1.32 Mbps, while the overhead due to FEC is an additional 6.6 Mbps.

This example gives just one method of optimizing the design parameters. One skilled in the art would appreciate that other issues such as the FEC method, statistical likelihood of code symbol errors as a function of the position in the de-interleaver row, decoding over multiple de-interleaving columns, and use of interleaving structures other than block interleaving can affect the optimization procedure.

Another aspect of the invention is the ability to generate erasure information and to use this information to improve FEC performance. An erasure is a code symbol that is marked as unknown for FEC decoding purposes. For a given FEC overhead, more erasures can be corrected than errors.

The critical issue in erasure decoding is generating the erasure information. The transmission of the refresh sequence allows for comparison between the known symbols and the decisions made by the DFE. If the number of decision errors on the refresh symbols exceeds a predetermined value, then the kD symbols preceding the refresh sequence are marked as erasures. Another method would be to monitor the mean-squared value of the error across the DFE decision device during some or all of the period between refresh sequences. Once again, if a predetermined threshold is reached, the preceding kD symbols are marked as erasures. The result of using error and erasure correction relative to error correction only is either a reduction in FEC overhead or an improvement in error rate at the output of the FEC decoder, whichever is preferable.

Figure 5:
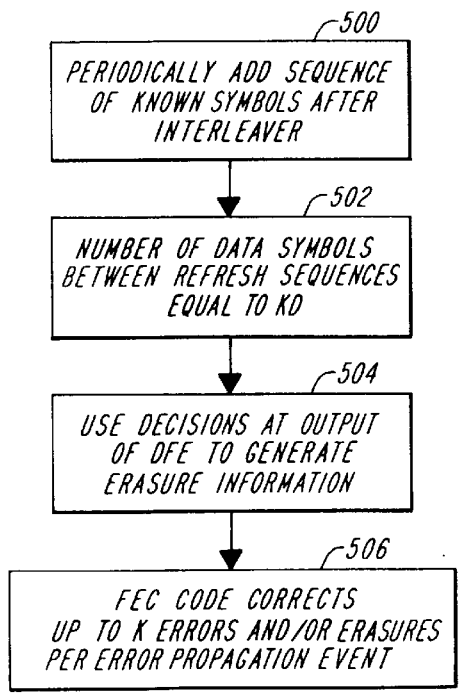
FIG. 5 is a flowchart showing an alternative method of integrating DFE and FEC to improve performance in point-to-multipoint digital transmission in accordance with the invention.

This aspect of the invention is illustrated in the flowchart of FIG. 5. The first two steps 500 and 502 are identical to steps 400 and 402 of FIG. 4. Step 504 entails using decisions at the output of the DFE to generate erasure information as discussed above. Step 506 involves performing FEC decoding to correct up to k errors and/or erasures per error propagation event, using the erasure information of step 504.

Referring back to the example, the use of erasure decoding would allow for a reduction in the FEC overhead. For Reed-Solomon coding with L checkbytes, the generalized correction capability is described by $2t+e \leq L$. For example, consider the situation where it is required to have $t+e=5$. L is thus a function of how many checkbytes are allotted for erasure correction and how many for error correction. If it can be assumed that the erasure side information will be sufficiently reliable to mark all errors as erasures, then pure erasure correction can be employed. This would require a (76,71) code, and the FEC overhead would be reduced to 3.3 Mbps. If the erasure information is deemed less reliable, then a compromise assumption of both error and erasure correction would be a better choice. For example, one could set t=2 and e=3, resulting in a (76,69) code with 4.6 Mbps of overhead. Error and erasure decoding is well known in the art.

The current state of the art assumes that preceding is used to avoid DFE error propagation in the point-to-point case, or that error propagation is simply not a problem in the point-to-multipoint case. The invention details how transmission of a periodic refresh sequence with a period that is a multiple of the length of the de-interleaver row, along with sufficient FEC correction power can be used to achieve the desired system error performance. It will be appreciated that the invention can be used for transmission in a very-high-rate digital subscriber loop (VDSL) system.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A method of obtaining a desired error rate performance in a point-to-multipoint digital transmission system suffering from error propagation, said system comprising a transmitter unit including a forward error correction encoder (FEC) which generates encoded information provided to an input of a data interleaver having block length N and interleaving depth D, and a data modulator which is coupled to an output of said data interleaver to receive a stream of data symbols, and at least one receiver unit including a decision feedback equalizer (DFE) which includes a feedback filter and provides an input to a data de-interleaver having block length N and interleaving depth D, and a FEC decoder which receives data from an output of said data de-interleaver, said method comprising:

periodically adding sequences of known symbols of length at least equal to the length of said feedback filter to the output of said data interleaver, said sequence being removed at said receiver unit prior to passing to said data de-interleaver;

establishing the number of data symbols between said periodic sequences to be equal to an integer multiple k of the interleaving depth D, thus limiting error propagation to cause no more than k errors per codeword of block length N; and setting said FEC code to correct at least said k errors per error propagation event.

2. A system for obtaining a desired error rate performance in a point-to-multipoint digital transmission system having error propagation, said system comprising:

a transmitter unit including a forward error correction encoder (FEC) which implements a code to information provided to an input of a data interleaver having block length N and interleaving depth D, and a data modulator which is coupled to an output of said data interleaver to receive a stream of data symbols; and at least one receiver unit including a decision feedback equalizer (DFE) which includes a feedback filter and provides an input to a data de-interleaver having block length N and interleaving depth D, and a FEC decoder which receives data from an output of said data deinterleaver, wherein sequences of known symbols of length at least equal to the length of said feedback filter are periodically added to the output of said data interleaver, the number of data symbols between said periodic sequences being equal to an multiple k of the interleaving depth D, thus limiting error propagation to cause no more than k errors per codeword of block length N, said FEC code serving to correct said k errors per error propagation event.

3. A method of obtaining a desired error rate performance in a point-to-multipoint digital transmission system suffering from error propagation, said system comprising a transmitter unit including a forward error correction encoder (FEC) which generates encoded information provided to an input of a data interleaver having block length N and interleaving depth D, and a data modulator which is coupled to an output of said data interleaver to receive a stream of data symbols, and at least one receiver unit including a decision feedback equalizer (DFE) which includes a feedback filter and provides an input to a data de-interleaver having block length N and interleaving depth D, and a FEC decoder which receives data from an output of said data de-interleaver, said method comprising:

periodically adding sequences of known symbols of length at least equal to the length of said feedback filter to the output of said data interleaver, said sequence being removed at said receiver unit prior to passing to said data de-interleaver;

establishing the number of data symbols between said periodic sequences to be equal to an integer multiple k of the interleaving depth D, thus limiting error propagation to cause no more than k errors per codeword of block length N; and utilizing decisions at output of said DFE to generate erasure information; and setting said FEC code to correct at least said k errors and/or erasures per error propagation event.

4. A system for obtaining a desired error rate performance in a point-to-multipoint digital transmission system having error propagation, said system comprising:

a transmitter unit including a forward error correction encoder (FEC) which implements a code to information provided to an input of a data interleaver having block length N and interleaving depth D, and a data modulator which is coupled to an output of said data interleaver to receive a stream of data symbols; and at least one receiver unit including a decision feedback equalizer (DFE) which includes a feedback filter and provides an input to a data de-interleaver having block length N and interleaving depth D, and a FEC decoder which receives data from an output of said data de-interleaver, wherein sequences of known symbols of length at least equal to the length of said feedback filter are periodically added to the output of said data interleaver, the number of data symbols between said periodic sequences being equal to an integer multiple k of the interleaving depth D, thus limiting error propagation to cause no more than k errors per codeword of block length N, and wherein decisions at the output of said DFE are used to generate erasure information, said FEC code serving to correct said k errors and/or erasures per error propagation event.

* * * * *